E. B. STONE.
ELECTROPLATING APPARATUS.
APPLICATION FILED DEC. 9, 1913.
1,108,410.
Patented Aug. 25, 1914.
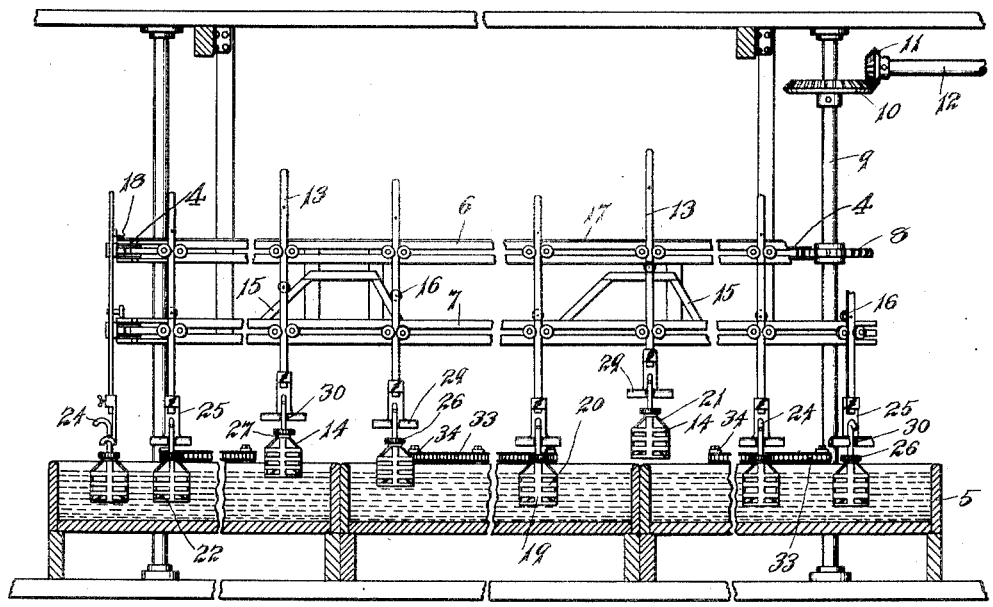
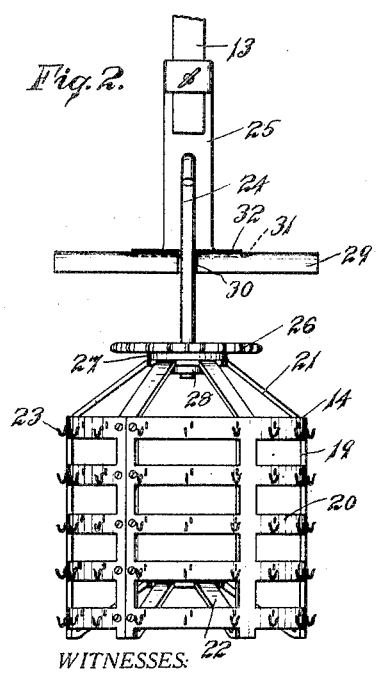
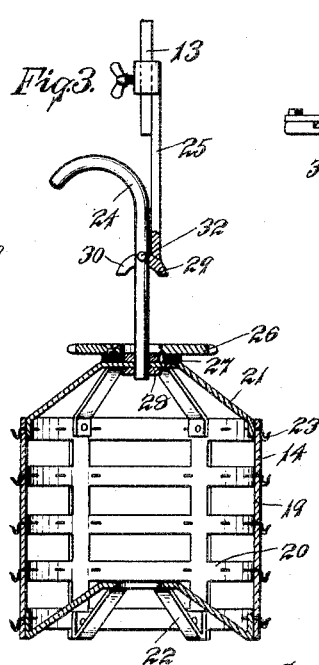
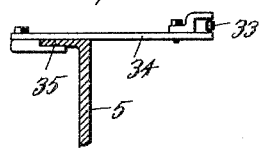
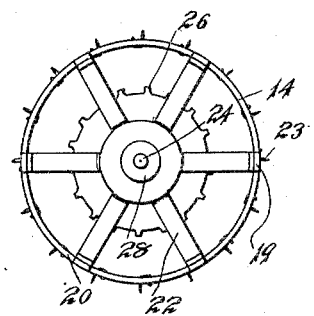
WITNESSES:
E. F. Eaton.
Louis Lucia
INVENTOR.
Elmer B. Stone,
BY
Arthur B. Jenkins,
ATTORNEY.

UNITED STATES PATENT OFFICE.

ELMER B. STONE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

ELECTROPLATING APPARATUS.

1,108,410.  Specification of Letters Patent.  Patented Aug. 25, 1914.

Application filed December 9, 1913. Serial No. 805,526.

*To all whom it may concern:*

Be it known that I, ELMER B. STONE, a citizen of the United States, and a resident of New Britain, in the county of Hartford and State of Connecticut, have invented a new and improved Electroplating Apparatus, of which the following is a specification.

My invention relates to the class of apparatus above named and an object of my invention, among others, is to increase the production of apparatus of this class and at the same time maintain its efficiency.

One form of device embodying my invention and in the construction and use of which the objects herein set out, as well as others, may be attained, is illustrated in the accompanying drawings, in which—

Figure 1 is a view in side elevation of an apparatus embodying my invention with parts broken away to show construction. Fig. 2 is a detail view on enlarged scale illustrating the construction and operation of the work holders embodying my invention. Fig. 3 is a detail view in section through a work holder embodying my invention. Fig. 4 is a bottom view of the same. Fig. 5 is a detail view showing the mounting of the rotating mechanism for the holders.

My invention is especially applicable to an apparatus in which work holders are caused to travel in a predetermined path and during which travel articles carried by the holders are subjected to treatment in baths of different character contained in different tanks or vats, the latter being disposed in a path curved more or less and underlying an endless chain by which the holders are carried.

In the accompanying drawings, the numeral 5 denotes the vats or tanks, that are preferably disposed in the form of an oval flattened at its sides, these tanks or vats being located under a carrier consisting preferably of two endless chains 4 traveling in proximity to guides 6—7, supported upon carrier wheels 8 secured to shafts 9 supported in any desired manner. These carrier wheels may be rotated in any desired manner, the mechanism herein shown consisting of a bevel gear 10 secured to one of the shafts 9, this gear meshing with a bevel gear 11 on a driving shaft 12. The stems 13 of work holders 14 are located at suitable intervals along the carrier, as shown in Fig. 1, these stems being constructed to have longitudinal reciprocating movement as by means of cams 15 located in the path of movement of rollers 16 on the stems by which operation the holders are raised and lowered at the proper time to pass such holders over the edges of the vats and immerse them in the successive vats containing different washing and plating baths.

All of the mechanism herein above described is of old and well known construction and further and detailed description is therefore omitted herein, it being however remarked, that in the apparatus heretofore employed, the articles to be plated have been arranged on the side of a flat holder so that the electric current passing from the anodes hung on the sides of the vats evenly attack the entire surface of the articles exposed to its influence while carried upon said holders, it being understood that the articles constitute the cathodes that are connected through the holder and the stems with a conducting bar 17 suitably arranged to receive brushes 18 from the holders in a manner well known.

The work holders 14, in order to increase their capacity, are formed with surfaces for receiving the articles on a plural number of sides, in the preferred form of construction and as shown herein these holders being round and of cylindrical shape, as shown in Fig. 4 of the drawings. Such holders each consists of a frame composed of longitudinal bars 19 and cross bars 20, these bars being connected by radially extending top bars 21 and bottom bars 22. Suitable means for supporting the articles to be plated are located on each frame, in the device herein shown hooks 23 being employed. Each frame is supported by a handle 24 removably attached to an adjustable bar 25 secured to the stem 13. A sprocket wheel 26 is secured to the upper end of each holder, preferably upon the top bars 21, this sprocket being insulated from the holder, as shown in Fig. 3 of the drawings, in which an insulation 27 is employed for the purpose. Each handle 24 is secured in place as by means of washers 28 secured to the handle and located on opposite sides of the top bars 21. A holder support 29 is located at the lower end of each adjustable bar 25, this support having a slot 30 extending laterally from about its longitudinal center to its edge and a groove 31 located in its upper side extends across said slot, this groove being adapted to receive a supporting pin 32 secured to the handle 24, this construction affording means for readily removing the holder from its supporting means. The adjustable bar 25 on each holder provides means for properly locating the holder in the vat, and the sprocket wheels engage with stationary sprocket chains 33 secured preferably to the sides of the vat as by means of arms 34 clamped to the lips 35 of the vat and extending inward from the upper edge of the vat to properly locate the chain. These chains are so located that when the holders are moving in a horizontal plane along the vat, being carried by the endless chains within the guides 6—7, the sprocket wheels 26 will engage with one of said chains, but as soon as each roller 16 encounters a cam 15 the sprocket wheel on the holder will have passed the end of the chain and have been disengaged therefrom, so that the holders are permitted to rise and to fall at the completion of which latter movement the sprocket wheel engages another chain 33.

The description herein applies to a single holder but it will be understood that many of these holders may be employed in a single structure, and the description will therefore apply to each.

The construction and operation enables a holder to be employed having a maximum capacity, and at the same time one in which all the articles carried by the holder will be subjected to the same influence, as to kind and degree, within the vats, so that all of such articles will be evenly plated, thus producing a device of maximum capacity and efficiency.

While I have shown and described herein a satisfactory construction of apparatus for effecting my purpose, this may be changed to a greater or lesser degree and yet be within the spirit and intent of the invention.

It will be understood that any means may be employed for rotating the holders, and while the chains 33 are shown and described herein as being stationary, it is not essential to the invention that they be maintained in this condition.

I claim—

1. In an electroplating apparatus including a vat within which the articles to be plated are received, a carrier, a holder supported by the carrier, said holder having a plural number of sides upon which the articles to be plated are supported, means for moving the carrier, and means for turning the holder within the vat.

2. In an electroplating apparatus including a plural number of vats within which the articles to be plated are received, a carrier, means for operating the carrier, a holder supported by the carrier, said holder having a plural number of sides upon which the articles to be plated are supported, means for turning the holders within the vats, means for moving the holders out of the vats, and means for moving the holders into said vats.

3. In an electroplating apparatus including a vat to receive the articles to be plated, a carrier having traveling movement over said vat, means for operating the carrier, a stem longitudinally movable on the carrier, a holder suspended from the end of said stem, said holder having a plural number of sides upon which the articles to be plated are supported, and means for rotating the holder.

4. In an electroplating apparatus including a vat within which the articles to be plated are received, a carrier having traveling movement over said vat, means for operating the carrier, a stem supported by said carrier, means for imparting longitudinal movement to said stem, a holder supported at the lower end of the stem and rotatable independently thereof, and means for rotating the holder.

5. In an electroplating apparatus including a number of vats, a carrier mounted for traveling movement over said vats, a stem supported by said carrier, means for imparting longitudinal movement to said stem, a holder rotatably supported at the lower end of the stem, a sprocket wheel secured to said holder, and a series of sprocket chains fixed against movement and located to engage said sprocket wheel when the latter is traveling horizontally and to be disengaged therefrom when the holder is traveling vertically.

6. In an electroplating apparatus including a vat, a carrier supported above the vat, means for operating the carrier, a stem mounted on the carrier, a bar adjustably supported by said stem, a holder removably secured to said bar, a sprocket chain supported against movement over said vat, and a sprocket wheel secured to said holder to engage said chain to impart rotation to said holder.

7. In an electroplating apparatus including a vat within which the articles to be plated are received, a carrier having traveling movement over said vat, means for operating the carrier, a stem supported by said carrier, means for imparting longitudinal movement to said stem, a holder supported at the lower end of the stem and rotatable independently thereof, and means arranged to rotate the holder only when in the vat.

8. In an electroplating apparatus including a number of vats, a carrier mounted for traveling movement over said vats, a stem supported by said carrier, a holder rotatably supported at the lower end of the stem, means for moving the holder vertically to remove it from and replace it in a vat, and means for rotating the holder when in said vat.

9. In an electroplating apparatus including a number of vats, a carrier mounted for traveling movement over said vats, a stem supported by said carrier, a holder rotatably supported by said stem, means for moving the holder vertically to remove it from and replace it in a vat, and means for rotating the holder only when in said vat.

10. In an electroplating apparatus including a number of vats, a carrier mounted for traveling movement over said vats, a stem supported by said carrier, means for imparting longitudinal movement to said stem, a holder rotatably supported by said stem, and means for rotating the holder only when in a vat.

11. In an electroplating apparatus including a number of vats, a carrier mounted for traveling movement over said vats, a stem supported by said carrier, means for imparting longitudinal movement to said stem, a holder rotatably supported by said stem, and means for imparting rotation to said holder.

ELMER B. STONE.

Witnesses:
W. L. HOWE,
RUTH M. BURKARTH.